Figure 1:
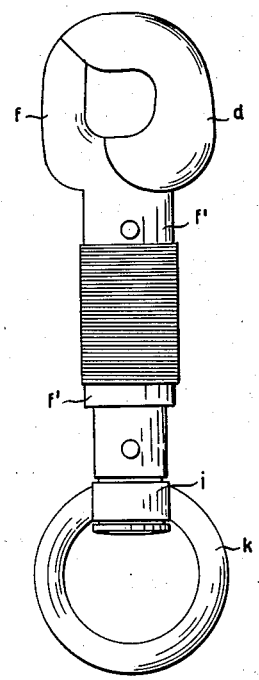

Oct. 16, 1951     J. H. ZEEVEN     2,571,402

ENDHOOK

Filed Dec. 30, 1946

Inventor

James H. Zeeven by Michael Sfhi

Patented Oct. 16, 1951

2,571,402

UNITED STATES PATENT OFFICE 2,571,402

END HOOK

Johannes H. Zeeven, Haren, Netherlands

Application December 30, 1946, Serial No. 719,169
In the Netherlands September 27, 1946

1 Claim. (Cl. 294—83)

The invention relates to an end-hook. This means a hook of the musket-hook-type comprising a hook-shaped portion and a locking-member due to the co-operation of which a closed ring may be formed which may also be opened again if required.

Suchlike hooks are used in all cases where a more permanent and more certain connection is desired than that which is possible with an open hook. In the latter case the connection, for instance of two cables, may be severed prematurely, if the cables should slack.

The musket-hooks owe their name to their use for the connection of a carbine (musket) to a rifle-belt. They are also used on watch-chains to form the connection with a watch by means of the permanently closed eye which a watch always possesses.

In suchlike musket-hooks the locking-member is always executed in the shape of a lip which is connected resiliently to the shaft of the hook-shaped portion, in such a way that the end thereof is pressed against the interior of the end of that hook-shaped portion, those ends lying against each other generally being suitably chamfered somewhat.

Suchlike hooks have the disadvantage that the structure is too feeble and too uncertain for the connections whereby great forces must be transmitted.

The hinged locking-member will soon work loose in the transverse direction and the locking system is endangered. The spring, for which there is not sufficient space, and which must consequently be made smaller than would be desired in connection with its function, will often slack soon, so that the locking-member does not close well in the direction of the movement.

Another disadvantage is that the end-hook, when it contains a ring or a suchlike member of the object connected therewith, often lacks sufficient space to allow the locking-member to be pressed back, in order to sever the connection, so that that purpose can only be attained with the greatest difficulty and often only by forcing and deformation of the hook.

The end-hook according to the invention avoids all these disadvantages and provides a strong, perfectly certain connection which can easily be loosened, even if under the greatest tension, so that this end-hook can consequently be used with great advantage for the connection of all sorts of towing and hauling-cables between carriages or ships, in the rigging on board ships, etc.

The end-hook according to the invention also comprises a hook-shaped portion and a locking-member, due to the co-operation of which an eye may be formed or opened, is characterized in that the locking-member has been disposed slidably on a straight portion of the shaft of the hook-shaped portion, and is then always pressed to the locked position by spring-action.

This embodiment of the invention is characterized in that the movable locking-member has been formed in such a way that it forms part of the finally closed eye of the lock-hook and no exterior force is ever applied to said locking member.

This embodiment has been represented by the Figures 1 to 5.

Figure 2:
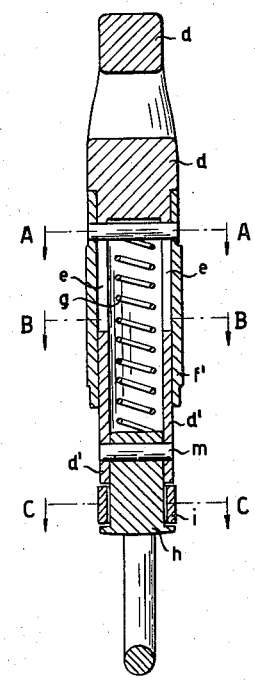
Figure 3:
Figure 4:
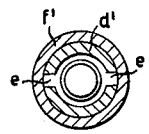
Figure 5:
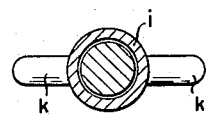

Figure 1 is a side elevation, and Figure 2 a longitudinal section of the device shown in Figure 1, whereas the Figures 3, 4 and 5 show cross-sections, respectively along the lines A—A, B—B and C—C of Figure 2.

In these figures the hook-shaped portion is formed by the member $d$, the cylindrical portion $d^1$ of which is hollow, and is furthermore provided with two longitudinal mutually opposed grooves $e$ extending along part of the length of the cylindrical shaft $d^1$.

The arm $f$ of the locking-member forms the eye at the hook together with $d$, and the shaft $f^1$ of said locking-member is concentrically disposed over the cylindrical shaft $d^1$. The shaft $f^1$ has preferably been roughened at the surface, as shown in Figure 1, in order to facilitate the retaining and the moving of that portion by one's fingers.

After placing $f^1$ on $d^1$, a bolt lying in the section A—A and passing through the grooves $e$ in the hollow shaft $d^1$ is fixed in the shaft $f^1$. Then a spring $g$ is introduced into the hollow space of the shaft $d^1$ and said space is closed with the portion $h$, upon which the securing member $i$ of the ring $k$ has first been disposed thereupon. The portions $d^1$ and $h$ are then connected by means of the bolt $m$.

The length of the spring $g$ is such that it is compressed in the hollow space of $d^1$ after this connection, so that it constantly exercises a pressure on the bolt lying in the section A—A, i. e., constantly presses the arm $f$ against the hook shaped portion $d$, whereby a perfectly certain locking is guaranteed.

Upon connection of the device to a load all the tractive force will be received by the hook-shaped portion $d$, and not by the locking-member $f$, which has consequently the result, that however great the tension may be in the cables connected by means of this hook, the hook can yet be unfastened by gripping the roughened surface of $f^1$ with the thumb and fingers and displacing the portion $f$—$f^1$ in the direction of the arrow, drawn in Figure 2. Thus this device presents a great advantage with regard to the known end-hooks, which always demand a removal of the tension on the hook member to enable the hook to be loosened, which release cannot always be obtained in practice.

What I claim is:

An end hook comprising in combination a first locking member composed of an open C-shaped locking portion and a cylindrical hollow shaft having a smaller diameter than the rear end of said open C-shaped locking portion so as to form an abutment along the same and provided with oppositely arranged straight slots extending along part of the length of said cylindrical hollow shaft; a second locking member composed of a substantially straight locking portion adapted to abut against the tip of said open C-shaped locking portion of said first locking member and a cylindrical hollow shaft surrounding and fitting closely around said cylindrical hollow shaft of said first locking member so as to abut with its front end against said abutment formed along the rear end of said open C-shaped locking portion of said first locking member when said locking members are in locking position; a pin passing through said oppositely arranged straight grooves in said cylindrical hollow shaft of said first locking member and secured at its ends to said cylindrical hollow shaft of said second locking member; a closure member secured to said cylindrical hollow shaft of said first locking member closing the open end thereof; and a helical spring arranged within said cylindrical hollow shaft of said first locking member abutting at its one end against said pin which is secured at its ends to said cylindrical hollow shaft of said second locking member and at its other end against said closure member closing the open end of said cylindrical hollow shaft of said first locking member.

JOHANNES H. ZEEVEN.

REFERENCES CITED

The following references are of record in the file of this patent:

UNITED STATES PATENTS

| Number | Name | Date |
| --- | --- | --- |
| 704,265 | McMaster | July 8, 1902 |
| 967,486 | Avery | Aug. 16, 1910 |
| 1,802,224 | Steigenberger | Apr. 21, 1931 |

FOREIGN PATENTS

| Number | Country | Date |
| --- | --- | --- |
| 101,633 | Germany | Feb. 18, 1899 |
| 82,205 | Switzerland | Feb. 2, 1920 |